(12) United States Patent
Lassonde et al.

(10) Patent No.: US 9,146,755 B2
(45) Date of Patent: Sep. 29, 2015

(54) SYSTEM AND METHOD FOR TRANSPORTING PLATFORM INDEPENDENT POWER CONFIGURATION PARAMETERS

(75) Inventors: Nick Lassonde, Simi Valley, CA (US); Kevin Hartsock, Santa Barbara, CA (US)

(73) Assignee: KASEYA LIMITED (IE)

( * ) Notice: Subject to any disclaimer, the term of this patent is extended or adjusted under 35 U.S.C. 154(b) by 1212 days.

(21) Appl. No.: 12/499,297

(22) Filed: Jul. 8, 2009

(65) Prior Publication Data

US 2011/0010708 A1    Jan. 13, 2011

(51) Int. Cl.
*G06F 9/455* (2006.01)
*G06F 9/445* (2006.01)

(52) U.S. Cl.
CPC .................................. *G06F 9/44505* (2013.01)

(58) Field of Classification Search
None
See application file for complete search history.

(56) References Cited

U.S. PATENT DOCUMENTS

| | | | |
|---|---|---|---|
| 7,380,039 B2 * | 5/2008 | Miloushev et al. | 710/244 |
| 7,610,577 B1 * | 10/2009 | Roth | 717/106 |
| 8,010,822 B2 * | 8/2011 | Marshall et al. | 713/324 |
| 8,578,266 B2 * | 11/2013 | Davison | 715/239 |
| 2009/0271787 A1 * | 10/2009 | Clark | 718/1 |
| 2011/0004676 A1 * | 1/2011 | Kawato | 709/221 |
| 2011/0023031 A1 * | 1/2011 | Bonola et al. | 718/1 |

* cited by examiner

*Primary Examiner* — Eric C Wai

(57) ABSTRACT

Configuration settings can be transferred from one machine by executing a first client application on a source machine to retrieve the configuration settings of the source machine. The configuration settings may be transformed into a platform and application independent format before being transferred to a target machine where a second client application transforms the configuration settings into platform or application dependent parameters appropriate for the target machine. In one example, the configuration parameters include a power policy that can be applied across a network.

12 Claims, 3 Drawing Sheets

SYSTEM AND METHOD FOR TRANSPORTING PLATFORM INDEPENDENT POWER CONFIGURATION PARAMETERS

FIELD OF THE INVENTION

This disclosure relates to systems and methods for transferring configuration settings between machines, and in particular to transferring configuration settings between machines having different operating systems and applications.

BACKGROUND OF THE INVENTION

The process of configuring machines on a computer network, whether physical machines or virtual machines, can be a laborious process. Typically, each machine is required to be configured individually, which can make it difficult to standardize configurations across a network. In particular, network policies are typically implemented machine by machine and even user by user.

What is required is a system and method for transporting configuration parameters across machines on a network.

SUMMARY OF THE INVENTION

In one aspect of the disclosure, there is provided a method for transferring configuration settings comprising probing a source machine for a plurality of configuration settings, generating a file comprising the plurality of configuration settings, providing the file to a plurality of machines, and executing the file on the plurality of machines to apply the plurality of configuration settings to the plurality of machines.

In one aspect of the disclosure, there is provided a system comprising at least one source machine, at least one target machine and a client application executable on at least one target machine. The client application is configured to receive a plurality of configuration settings of the source machine, and apply the configuration settings to at least one target machine.

In one aspect of the disclosure, there is provided a computer-readable medium comprising computer-executable instructions for execution by a processor, that, when executed, cause a first processor of a first machine to retrieve a power policy from a data storage, communicate the power policy to a second processor of a second machine, enact the power policy on the second machine.

BRIEF DESCRIPTION OF THE DRAWINGS

Reference will now be made, by way of example only, to specific embodiments and to the accompanying drawings in which.

DETAILED DESCRIPTION OF THE INVENTION

Figure 1:
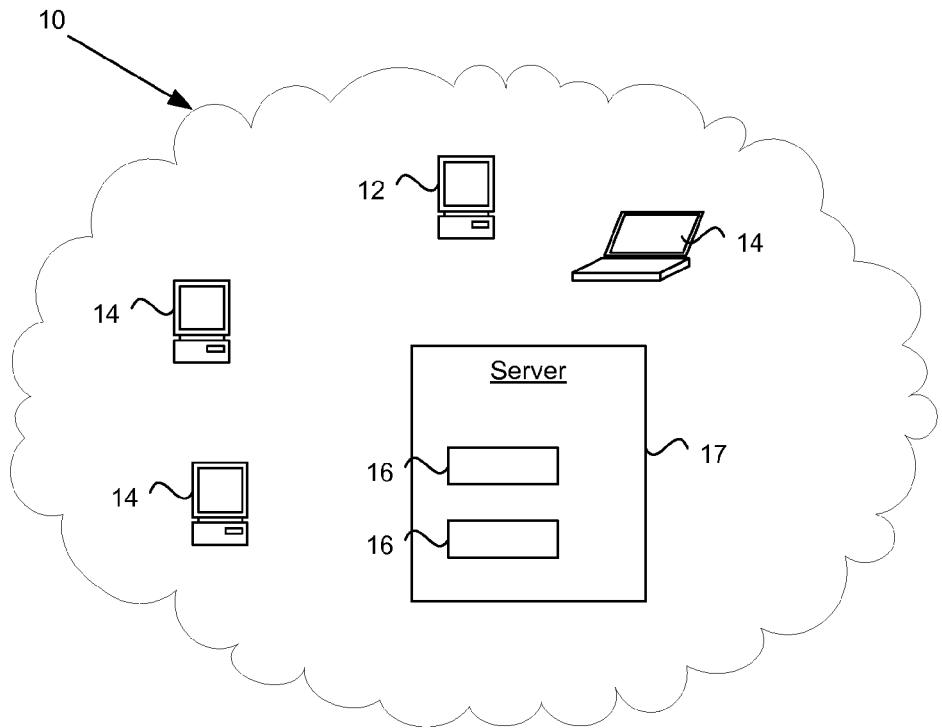
FIG. 1 illustrates a computer network.

A computer network is shown generally at 10 in FIG. 1. In one embodiment, the network 10 may include a plurality of machines which may include one or more physical machines 14 such as desktops, laptops, mobile browsers, etc and one or more virtual machines 16 that may be hosted on a virtual server 17. The network 10 may also include at least one administrator machine 12. It will be understood by a person skilled in the art that the network 10 may be configured in many possible ways and with additional components such as servers, communication hubs, network firewalls, remote access points, etc.

Figure 2:
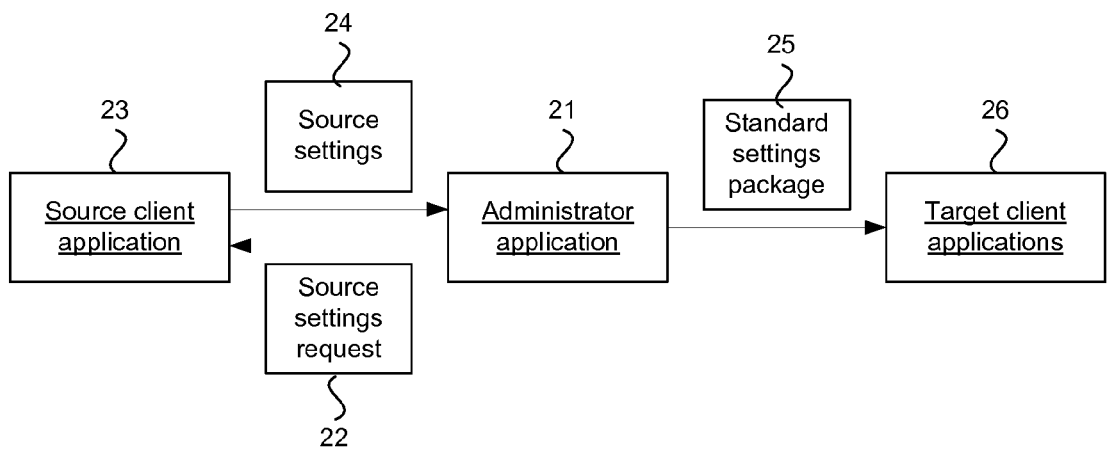
FIG. 2 illustrates an interaction between an administrator application and client applications on source and target machines.

As shown in FIG. 2, an administrator application 21 may be provided that provides the ability to retrieve the desktop configuration for an arbitrary user and to deploy the desktop configuration to other users on a multiple of machines at multiple locations.

Figure 3:
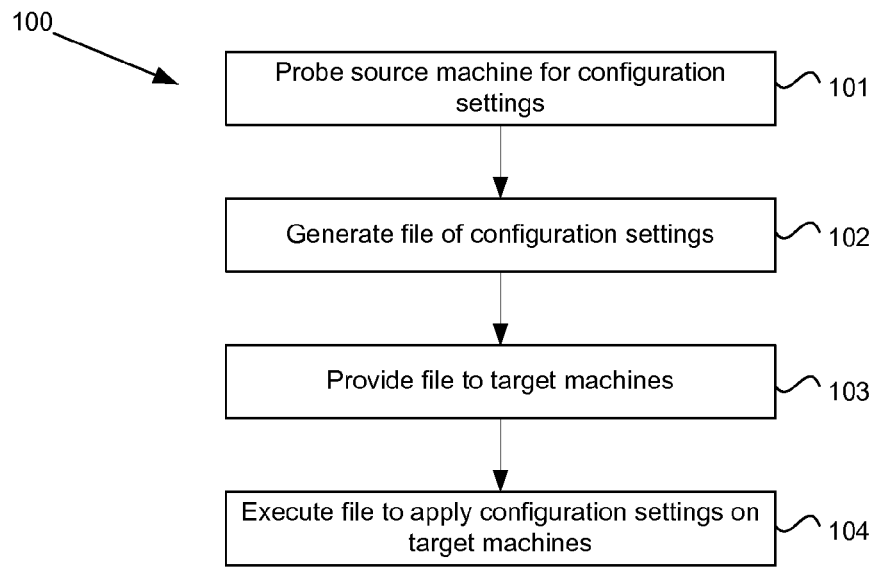
FIG. 3 illustrates a method for transferring configuration settings.

A method for transferring configuration settings between machines on the network will now be described with reference to the flowchart 100 of FIG. 3. At step 101, the administrator application probes a source machine for a plurality of configuration settings. On receipt of the configuration settings from the source machine, the administrator application generates a file (step 102) having the configuration settings. The file is provided to a plurality of target machines on the network (step 103) which execute the file to apply the configuration settings on the respective machines (step 104).

The administrator application 21 allows an administrator to set up a desktop standard settings package 25 which is done by specifying the user whose settings are to be collected, and the machine that contains that user. The administrator then indicates the application and system settings they would like to collect for that user. When the administrator has made these selections, the administrator application executes to create the desktop standard package. Specifically, the administrator application launches a source client application 23 on the source machine, by providing a source settings request 22. The source settings 24 are collected for the specified user. This may all be done from a single interface, such as the administrator machine 12, or any machine which may host the administrator, including a remote machine in communication with the network.

Once the package 25 is created, the administrator can then use that package to launch client applications 26 on any number of other target machines on the network. The settings that are stored in the package may be applied to all users on the target machines or only selected users.

Multiple packages can be configured, and as long as they don't contain the same types of settings, an administrator is able to apply the different packages to get different sets of configurations for the users on a machine, or group of machines.

The administrator does not need to know what operating system they are collecting the settings from. They also do not have to make sure the selected applications are installed on the source machine. The client application on the local machine takes care of detecting the operating system type, and detecting the installed applications. The client application will do the processing necessary to retrieve and transform the requested settings.

An advantage of the client application is that it also allows the administrator to collect the settings from one operating system, and apply them on a different operating system. The client application takes care of any transformations necessary. When the client application collects settings from the original operating system, the settings will be recorded in a platform neutral format. When applying to the target operating system, the platform neutral format is converted into the appropriate format for the target operating system. For example, the original operating system may store the setting in a registry of settings. When collecting the settings, the client application will read from the registry of settings and store than in an XML file. When the settings are then applied to the target operating system, the XML file will be read, and the client application will write out the new format, which could be a system registry, an flat-file, an XML file, or any other discreet format. This further provides the ability to migrate settings between disparate operating systems and applications on machines at a remote source and eases the process of upgrading the operating system, as end-users are able to keep some of their existing settings from the old system.

For example, the administrator application may provide a template that allows a user, who may or may not be an administrator, to select the settings to be backed up when a migration is to be undertaken.

The settings are stored in a platform independent fashion meaning that once the data, system and application settings are collected, they can be moved between operating systems (for instance, Windows to OS X), or between applications (Internet Explorer to Mozilla Firefox). The transformations of the data may be done at the time the settings are applied to the new system.

Allowing this functionality from a remote interface means that a user can select and backup the systems' settings, and the application settings, without having to have physical access to the system.

Once a system is backed up, those settings can then be applied to one or more other systems. Additionally, when the backup is performed, it is not required to know what the target machine will be. For instance, a backup of an XP machine can be created and at a later point, it may be determined to choose to implement the backed up settings on other targets such as XP, Vista, OS X, Linux, etc.

In one specific embodiment, the applications can be used to apply a set of power settings preferences, i.e. a Power Policy, to all users on a machine, or all users on groups of machines from a single interface.

The user or administrator can set up a variety of Power Policies, which are a named set of power preferences (for example, turn of hard drive after 10 minutes, set system to go into standby after 1 hour of inactivity, etc).

The user does not need to know the details of the system these settings will be applied to, they are just setting up the parameters of the power policy. This policy can then be sent down to any number of target machines to be applied.

The client application which resides on the target machines is configured to take this policy and figure out what needs to be done on the target system based on operating system type, and power APIs, to apply these settings to all users on the machine. The target machine may not support the settings in the policy (for example, a desktop machine will not have battery power settings available). The client application takes care of these inconsistencies, and applies the settings that are possible. The settings may be applied through API calls specific for the target operating system, file manipulation, registry values, etc.

This functionality allows an organization to set up a consistent configuration for their machines from a single interface without having to make the changes interactively on each machine, or for each user.

Coupled with the ability to set the power settings of a machine on the network comes the ability to discover power settings of a multitude of machines and determine estimated power savings in different possible configurations. This enables the user to do "what if" scenarios and determine the best possible savings and see what the tradeoffs are.

From a single location, the client applications can be used to select and audit a group of machines to collect the current power preferences. A user does not have to know the operating system type, machine type (server, workstation, laptop) or how power settings are stored on the machines. The settings are collected, and then stored in a platform independent fashion. Interaction with the end users on the audited machines is not necessary.

The user can then set the criteria for determining how to evaluate potential savings based on changing the power configurations. This can all be done without having to again contact the original machines from which the data was collected.

Figure 4:
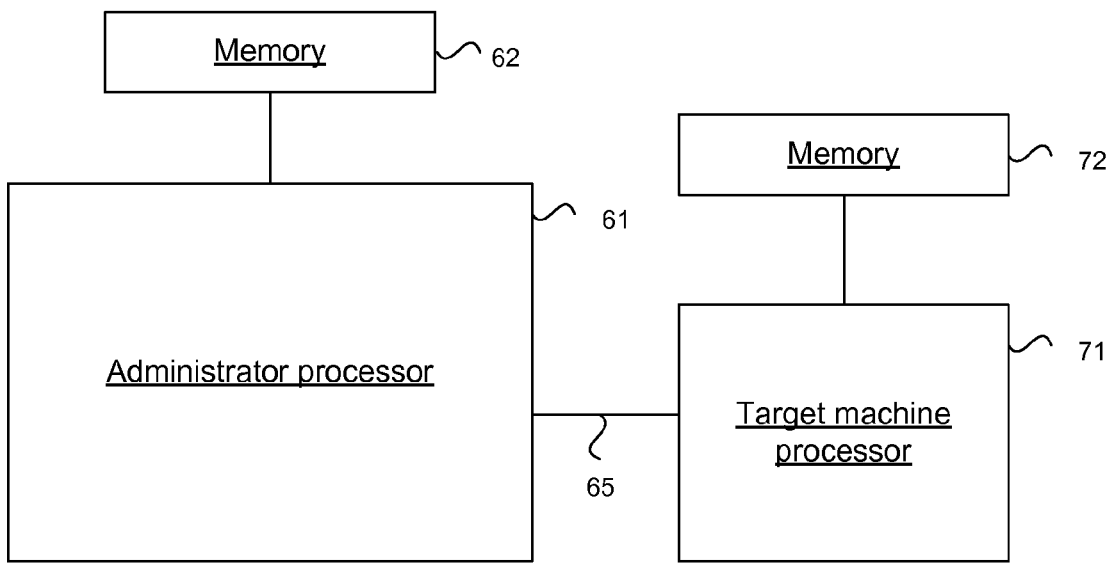
FIG. 4 illustrates a processor and memory of a machine that enacts a power policy.
Figure 5:
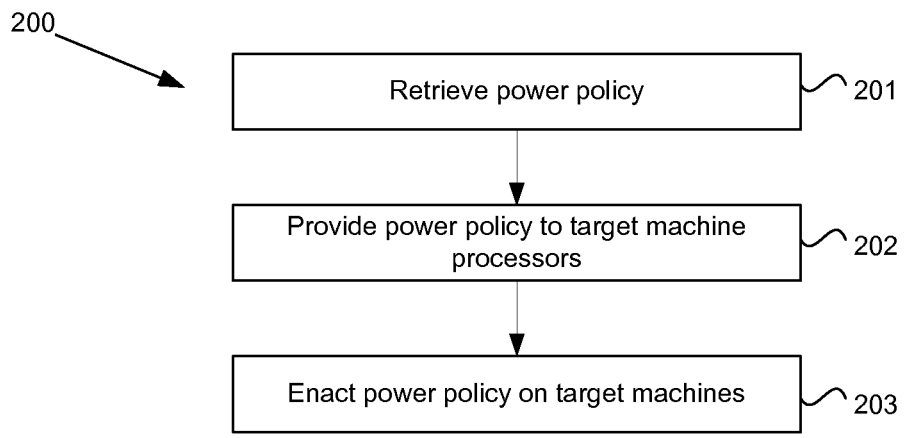
FIG. 5 illustrates a set of instructions that are executable on the processor and memory of FIG. 4.

The components of the system 10 may be embodied in hardware, software, firmware or a combination of hardware, software and/or firmware. In a hardware embodiment, the administrator application may be executed on a device, such as a computer, etc including a processor 61 operatively associated with a memory 62 as shown in FIG. 4. The memory 62 may store instructions that are executable on the processor 61. An instruction set 200 that may be executed on the processor 61 is depicted in the flowchart of FIG. 5. Specifically, when executed, the instruction set 200 allows the processor to retrieve a power policy from a data storage (step 201), which may be provided by memory 62. The processor may communicate the power policy to a processor 71 of a target machine (step 202) that may also be operatively associated with a memory 72. The administrator processor 61 may communicate with the target processor 71 through any suitable communications link 65. When the power policy is received at the target processor, the power policy may be enacted on the target machine (step 203).

Although embodiments of the present invention have been illustrated in the accompanied drawings and described in the foregoing description, it will be understood that the invention is not limited to the embodiments disclosed, but is capable of numerous rearrangements, modifications, and substitutions without departing from the spirit of the invention as set forth and defined by the following claims. For example, the capabilities of the invention can be performed fully and/or partially by one or more of the blocks, modules, processors or memories. Also, these capabilities may be performed in the current manner or in a distributed manner and on, or via, any device able to provide and/or receive information. Further, although depicted in a particular manner, various modules or blocks may be repositioned without departing from the scope of the current invention. Still further, although depicted in a particular manner, a greater or lesser number of modules and connections can be utilized with the present invention in order to accomplish the present invention, to provide additional known features to the present invention, and/or to make the present invention more efficient. Also, the information sent between various modules can be sent between the modules via at least one of a data network, the Internet, an Internet Protocol network, a wireless source, and a wired source and via plurality of protocols.

What is claimed is:

1. A method for transferring configuration settings comprising:

probing a source machine for a plurality of configuration settings, wherein probing a source machine comprises executing a client application on the source machine that retrieves the plurality of configuration settings and converts the plurality of configuration settings into a platform independent format, and wherein the plurality of configuration settings comprise a plurality of power settings corresponding to a plurality of machines;

generating a power policy comprising the plurality of power settings;

generating a file comprising the plurality of configuration settings in the platform independent format;

wherein the file comprises at least one operational policy parameter to provide at least one operational preference limit during setup of a plurality of machines and comprises the power policy;

providing the file to the plurality of machines; and executing the file on the plurality of machines to apply the plurality of power settings to the plurality of machines; wherein at least one of the plurality of machines is a separate physical machine to the source machine;

executing a client application on each of the plurality of machines;

wherein executing the file on the plurality of machines to apply the plurality of power settings to the plurality of machines comprises the client application converting the platform independent format of the plurality of configuration setting into a platform dependent configuration setting applicable to a platform of the respective machine.

2. The method according to claim 1 wherein the file comprises a plurality of instructions that, when executed, apply the plurality of configuration settings to the plurality of machines.

3. The method according to claim 1 comprising executing the file within the client application on each of the plurality of machines.

4. The method according to claim 3 wherein the client application on each of the plurality of machines converts an application independent configuration setting into an application dependent configuration setting applicable to an application that operates on the respective machine.

5. The method according to claim 1 wherein the plurality of machines comprises at least one virtual machine.

6. A system comprising:
at least one source machine configured to generate a file comprising a plurality of configuration settings comprising at least one operational policy parameter to provide at least one operational preference limit during setup of a target machine;
a client application executable on the source machine that is configured to:
retrieve a plurality of configuration settings of the source machine, and convert the plurality of configuration settings into a platform independent format, and wherein the plurality of configuration settings comprise a plurality of power settings corresponding to a plurality of machines; and
generate a power policy comprising the plurality of power settings;
at least one target machine that is a separate physical machine to the source machine, the at least one target machine comprising at least one processor; and
a client application executable on the at least one processor of the target machine that is configured to:
apply the configuration settings and the power policy to the at least one target machine and set the at least one operational preference limit;
wherein the client application of the respective target machine is configured to transform the plurality of configuration settings into platform specific configuration settings for an operating platform of the respective target machine.

7. The system according to claim 6 wherein the administrator application is configured to generate a back-up file comprising the plurality of configuration settings.

8. The system according to claim 7 wherein the administrator application is configured to record the plurality of configuration settings into the back-up file in a platform independent format.

9. The system according to claim 8 wherein the at least one source machine and the at least one target machine operate different operating systems and wherein the client application of the respective target machine is configured to transform the plurality of configuration settings to an operating system of the target machine.

10. The system according to claim 6 wherein the source machine comprises an interface that is configured to allow a user to specify one or more configuration settings to migrate from a source machine to a target machine.

11. A non-transitory computer-readable medium comprising computer-executable instructions for execution by a processor, that, when executed, cause a first processor of a first machine to:
probe a source machine for a plurality of configuration settings, wherein to probe a source machine comprises executing a client application on the source machine that retrieves the plurality of configuration settings and converts the plurality of configuration settings into a platform independent format, and wherein the plurality of configuration settings comprise a plurality of power settings corresponding to a plurality of machines;
generate a power policy comprising the plurality of power settings;
generate a file comprising the plurality of configuration settings comprising at least one operational policy parameter to provide at least one operational preference limit during setup of a plurality of machines and comprising the power policy;
communicate the file to a second machine; and
execute the file the second machine to apply the plurality of power settings to the second machine, wherein the second machine is a separate physical machine to the source machine:
transform one or more power settings of the power policy into platform dependent power settings that are applicable to an operating platform of the second machine.

12. The non-transitory computer-readable medium according to claim 11 comprising computer executable instructions that, when executed cause the first processor to:
retrieve the power settings from a third processor of a third machine;
generate the power policy from the one or more power settings; and
store the power policy in the data storage.

* * * * *